(12) United States Patent
Lu

(10) Patent No.: US 7,367,745 B2
(45) Date of Patent: May 6, 2008

(54) SECURING ASSEMBLY FOR USE BETWEEN A BIKE TRAILER AND A BIKE

(76) Inventor: Ching-Mei Lu, 2F, No. 10, Lane 46, Yanji St., Taipei (TW)

( * ) Notice: Subject to any disclaimer, the term of this patent is extended or adjusted under 35 U.S.C. 154(b) by 108 days.

(21) Appl. No.: 11/252,725

(22) Filed: Oct. 19, 2005

(65) Prior Publication Data

US 2007/0086851 A1    Apr. 19, 2007

(51) Int. Cl.
  *B60B 37/10* (2006.01)
(52) U.S. Cl. ............... 403/321; 403/324; 403/330; 301/111.06; 301/124.02
(58) Field of Classification Search ............... 403/321, 403/324–326, 330, 87, 95, 96, 98, 322.1, 403/322.4; 24/645; 292/5, 6, 63, 64, 67, 292/300, 301; 301/111.06, 124.02, 125
See application file for complete search history.

(56) References Cited

U.S. PATENT DOCUMENTS

| 1,491,637 | A | * | 4/1924 | Schrum ................... 24/645 |
| 2,779,224 | A | * | 1/1957 | Coggburn |
| 3,088,752 | A | * | 5/1963 | Dressen ................... 280/508 |
| 3,894,451 | A | * | 7/1975 | Putsch |
| 4,474,492 | A | * | 10/1984 | Fleitas ................... 403/322.4 |
| 4,531,757 | A | * | 7/1985 | Kuhn ................... 280/497 |
| 5,332,250 | A | * | 7/1994 | Thorwall et al. ........... 280/507 |
| 5,827,208 | A | * | 10/1998 | Mason et al. |
| 6,039,500 | A | * | 3/2000 | Kwon ................... 403/319 |
| 6,120,106 | A | * | 9/2000 | Liao ................... 301/111.06 |
| 6,383,156 | B1 | * | 5/2002 | Enzerink et al. |
| 6,401,578 | B1 | * | 6/2002 | Domenge |
| 6,659,708 | B2 | * | 12/2003 | Heiple ................... 403/321 |
| 2004/0094492 | A1 | * | 5/2004 | Greenwald et al. |

* cited by examiner

Primary Examiner—Daniel P. Stodola
Assistant Examiner—Ernesto Garcia
(74) Attorney, Agent, or Firm—Hershkovitz & Associates, LLC; Abe Hershkovitz

(57) ABSTRACT

A securing assembly for a bike and a bike trailer includes a securing body provided with a gap defined in the securing body and composed of two plates each provided with an elongated hole and a cutout to respectively correspond to and align with the elongated hole and cutout of the other plate of the securing body and a hook pivotally and movably received in the gap. When the hook is at a first position, the hook is able to close opening of the cutout in the securing body so as to confine movement of a free end of the rod after the free end of the rod is received in the cutout and when the hook is at a second position, the hook is able to open the cutout to release the confinement to the free end of the rod to allow the free end of the rod to escape from the securing body to allow disengagement between the bike trailer and the bike.

4 Claims, 7 Drawing Sheets

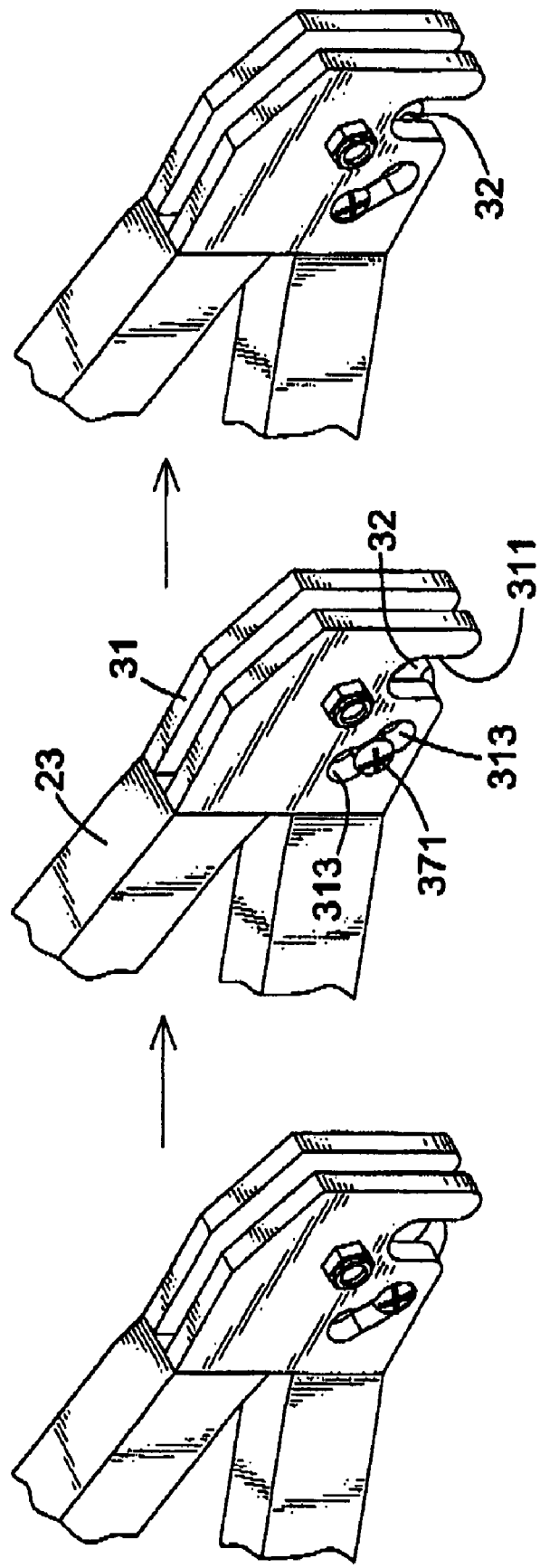

— 1 —

SECURING ASSEMBLY FOR USE BETWEEN A BIKE TRAILER AND A BIKE

BACKGROUND OF THE INVENTION

1. Field of the Invention

The present invention relates to a securing assembly, and more particularly to a securing assembly for a bike trailer with which a bike trailer is securely connected to a bike when the securing assembly is activated and can be easily disconnected when deactivated.

2. Description of the Related Art

A bike trailer is usually connected to a bike via a securing assembly between the bike trailer and the bike, A conventional securing assembly is normally provided with two hooks to connect to the rear axle of the bike and a front portion of the trailer, respectively. With the provision of the securing assembly, a biker is able to tow a trailer. However, the conventional securing assembly suffers from a serious drawback, which results in the easy breakage of the connection between the bike and the bike trailer. The reason for the easy breakage is that the towing force from the bike is in line with the connection between the bike and the bike trailer such that whenever the bike is moved, the driving force to propel the bike forward is also working to break the connection with the bike trailer.

To overcome the shortcomings, the present invention provides an improved securing assembly to mitigate the aforementioned problems.

SUMMARY OF THE INVENTION

The primary objective of the present invention is to provide a securing assembly for use between a bike and a bike trailer.

The securing assembly of the present invention connects to a crossbar extending through a rear wheel hub of a bike and comprises two securing bodies and a bracket with two free ends. The two securing bodies are mounted respectively on the free ends of the bracket. The an opposite end of the bracket is mounted to a trailer. A securing body comprises two plates with a gap formed in between. A hook is pivotally mounted in the gap. A cutout is defined in the securing body through the two plates to receive a distal end of the crossbar. The hook pivots to close an opening of the cutout to secure the distal end of the crossbar in the securing body.

Another feature of the present invention is an elongated hole defined through the plates of the securing body. The elongated hole is composed of two large holes with a small hole in between and communicating with the two large holes. An adjustment bolt is movably received in the elongated hole through the two plates of the securing body and a hole in the hook. The adjustment bolt pivots the hook such that when the adjustment bolt is at a first position, the hook closes the open end of the cutout of the securing body. When the adjustment bolt is at a second position, the hook opens the open end of the cutout to allow the distal end of the crossbar to be released and thus the trailer can be freely disengaged from the bike.

A further feature of the present invention is that the adjustment bolt has a head with a diameter smaller than those of both of the large holes but larger that of the small hole such that the head can be received in either one of the large holes but not in the small hole. Therefore, when the head is received in either one of the large holes, the hook is fixed in position.

Other objectives, advantages and novel features of the invention will become more apparent from the following detailed description when taken in conjunction with the accompanying drawings.

BRIEF DESCRIPTION OF THE DRAWINGS

FIGS. 6A, 6B and 6C are operational perspective views showing the movement of a securing bolt in an elongated hole in the securing body of the securing assembly in accordance to the present invention.

DETAILED DESCRIPTION OF THE PREFERRED EMBODIMENT

Figure 1:
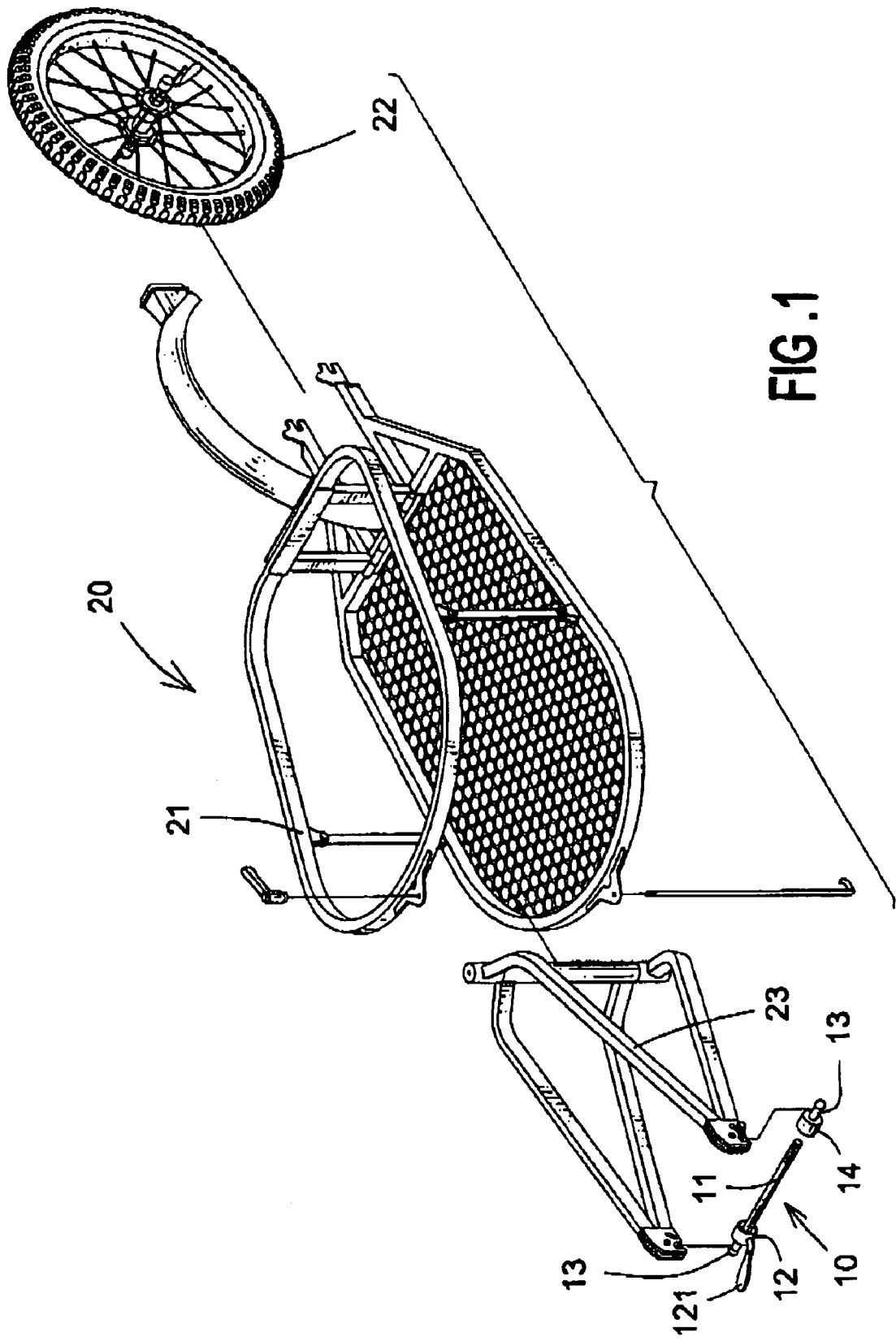
FIG. 1 is an exploded perspective view of a securing assembly in accordance to the present invention in relation to a bike trailer.

With reference to FIG. 1, the securing assembly in accordance with the present invention is used between a bike and a bike trailer (20) having a frame (21) and a wheel (22) rotatably mounted on the frame (21). The frame (21) further has a bracket pivotally connected to the frame (21) and provided with two arms (23) extending outward therefrom. A crossbar (10) extends through the rear hub of a bike and includes a rod (11) and two caps (14) mounted to two ends of the rod (11). Each cap (14) has an ear (12) extending from an outer periphery of the cap (14) and an extension (13) extending out and having a diameter smaller than that of the cap (14).

Figure 2:
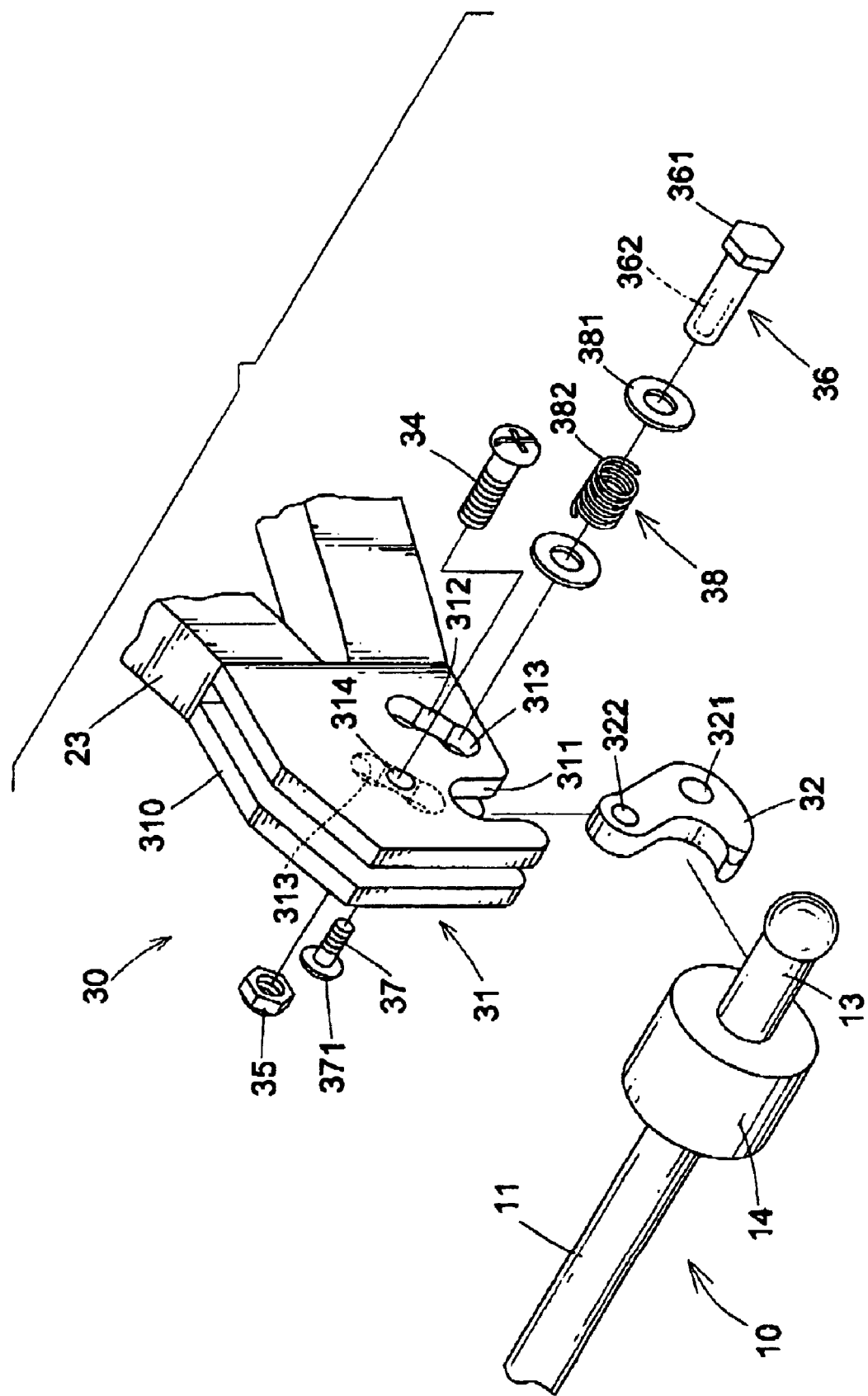
FIG. 2 is an exploded perspective view of a securing body of the securing assembly in FIG. 1.

With reference to FIG. 2, the securing assembly (30) of the present invention includes a securing body (31), a hook (32), an adjustment bolt and a securing bolt (34).

The securing body (31) is integrally formed on a free end of an arm (23) and is composed of two plates (310) with a gap defined between the two plates (310) to receive therein the hook (32). Each plate (310) has a cutout (311) defined in a bottom of the plate (310) to align with the cutout (311) of the other plate (310). An elongated hole is defined through the plate (310) to align with the elongated hole of the other plate (310) and a securing hole (314) adjacent to the cutout (311) to receive the securing bolt (34). Each elongated hole is composed of two large holes (313) and a small hole (312) in between the two large holes (313). The small hole (312) communicates with the two large holes (313).

The hook (32) is arcuate in shape and has a central hole (321) defined in a central portion of the hook (32) and a hole (322) defined in a top portion of the hook (32) to align with the securing holes (314) of the securing body (31) so that the securing bolt (34) is able to extend through the aligned securing holes (314) and the hole (322) of the hook to engage with a nut (35) so as to pivotally secure the hook (32) between the two plates (310).

The adjustment bolt includes a pressing bolt (36) and a moving bolt (37). The pressing bolt (36) has a first head (361) having a diameter larger than those of the large holes (313) and the small hole (312) of the securing body (31) and a channel (362) defined in a free end of the pressing bolt (36) opposite the first head (361). The moving bolt (37) includes a second head (371) having a diameter smaller than a diameter of both of the large holes (313) and larger than a diameter of the small hole (312). The moving bolt (37) is extended through the plates (310) via either one of the large holes (313) from one plate (310) of the securing body (31), the central hole (321) of the hook (32), the large hole (313) of the other plate (310) of the securing body (31) and into the channel (362) of the pressing bolt (36) so as to move together with the pressing bolt (34).

In addition, a resilient member (38) is provided to one side of the securing body (31) and includes two washers (381) and a spring (382) sandwiched between the two washers (381).

Figure 3:
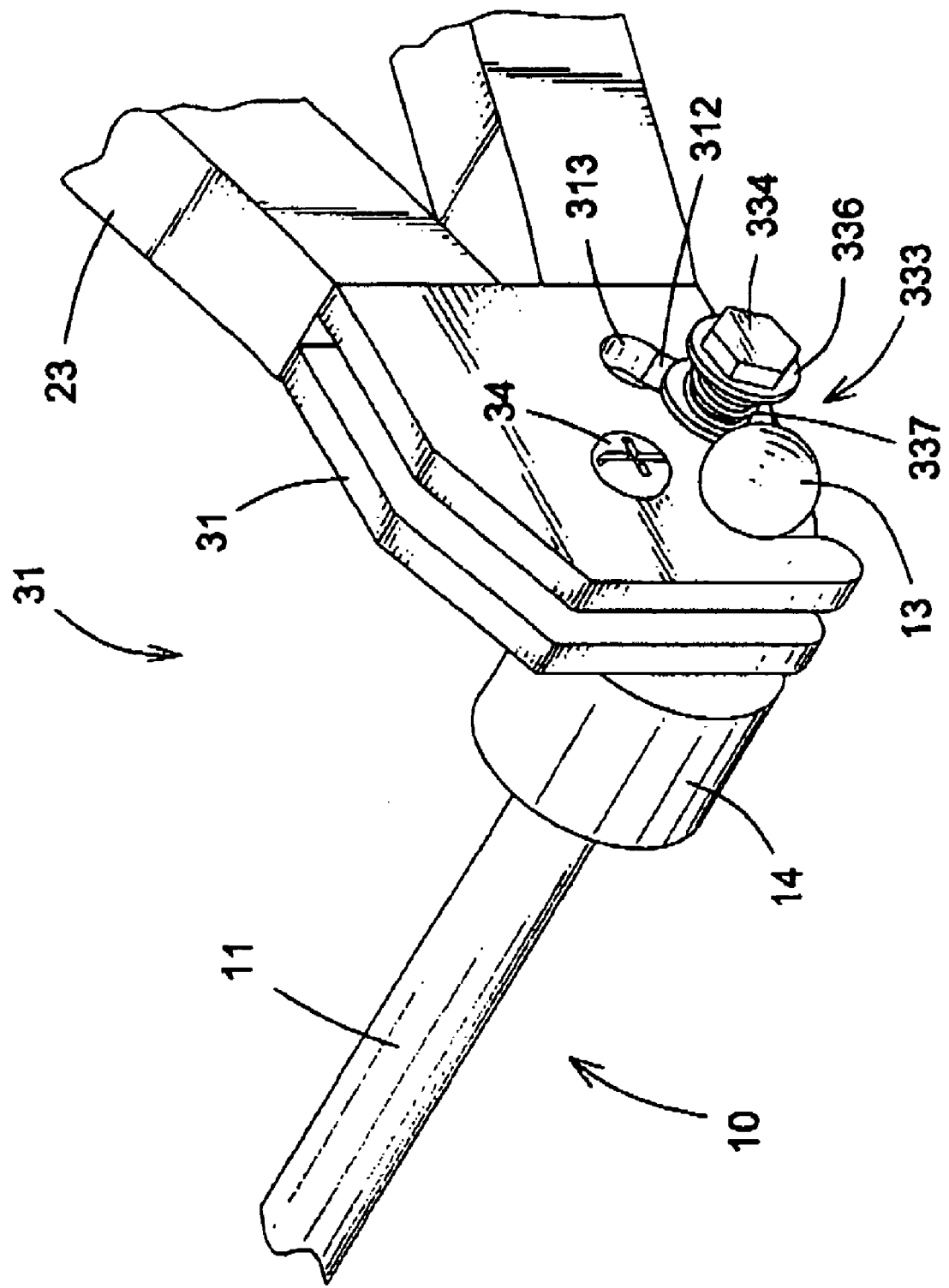
FIG. 3 is a perspective view of the securing body of the securing assembly in FIG. 1.

With reference to FIG. 3, when the securing assembly of the present invention is assembled, it is noted that the securing bolt (34) is extended through the securing hole (314) from one side of the securing body (31), the hole (322) of the hook (32) and the securing hole (314) of the other side of the securing body (31) to engage with the nut (35) so that the hook (32) is pivotally received in the gap between the two plates (310).

Then the pressing bolt (36) is extended through the resilient member (38) and the large hole (313) under the small hole (312) to allow the moving bolt (37) to be screwed into the channel (362) of the pressing bolt (36) such that the hook (32) is secured between the two plates (310) to be able to confine the extension (13) of the crossbar (10) inside the cutout (311) of the securing body (10).

Figure 4:
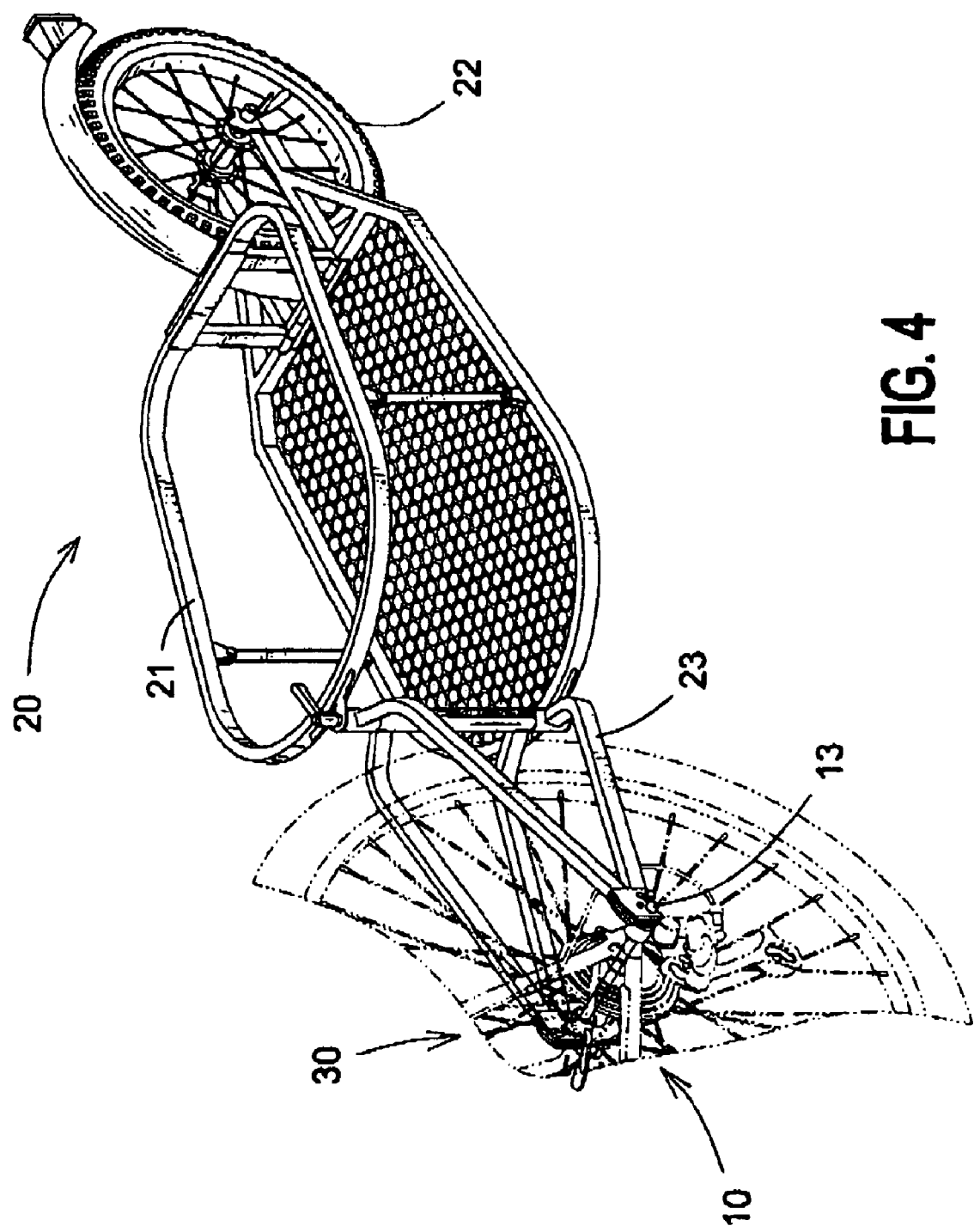
FIG. 4 is an operational perspective view of the securing assembly in accordance to the present invention mounted between a rear wheel of a bike and a bike trailer.

With reference to FIG. 4, after the above assembly of the securing assembly is finished, the user can connect the bike trailer (20) to the rear wheel of a bike.

Figure 5A:
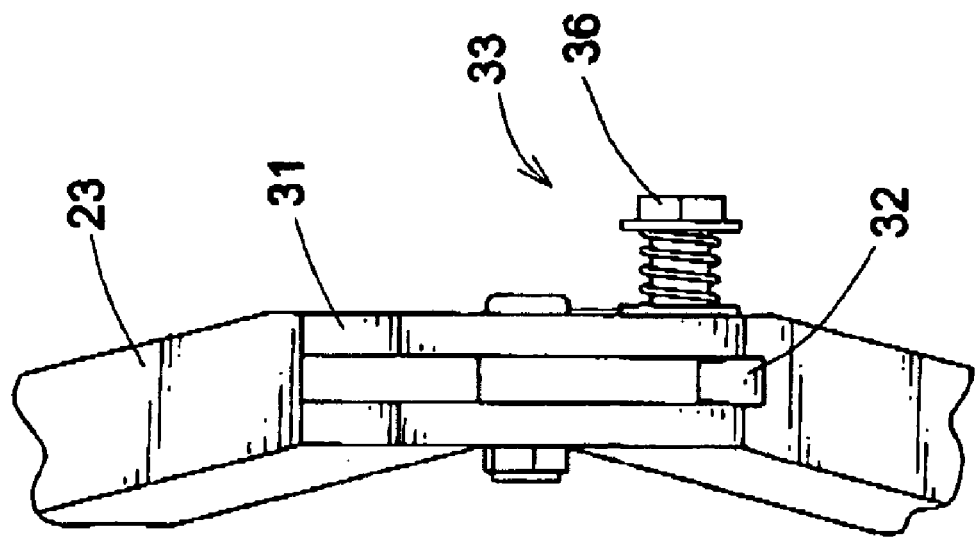
FIGS. 5A and 5B are operational perspective views of an adjustment bolt of the securing assembly in accordance to the present invention.
Figure 5B:
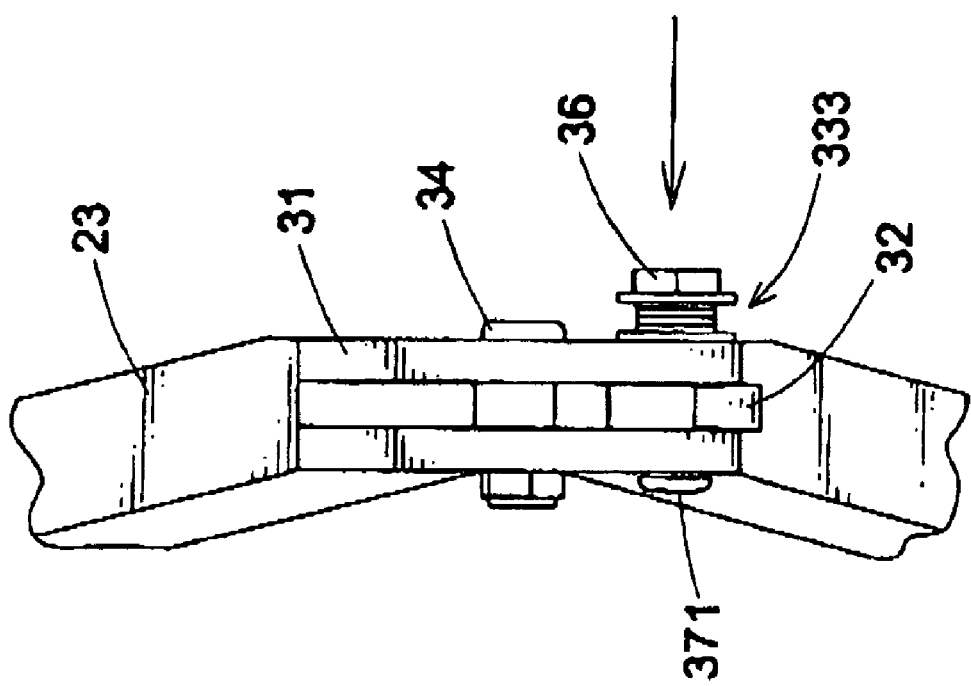

With reference to FIGS. 5A and 5B, it is noted that when the user is to release the confinement to the extension (13) of the crossbar (10), the user may press the pressing bolt (36) to allow the second head (371) of the moving bolt (37) to extend out of the large hole (313). Then because the moving bolt (37) including the second head (371) has a diameter smaller than those of the large holes (313) and the small hole (312), the moving bolt (37) together with the pressing bolt (36) is able to move freely in the elongated hole of the securing body (31). That is, the moving bolt (37) is able to move from the lower large hole (313) to the upper large hole (313) via the small hole (312). After the movement of the moving bolt (37) as well as the pressing bolt (36), due to the second head (371) of the moving bolt (37) being smaller than either one of the large holes (313) but larger than the small hole (312), the second head (371) is received in the upper large hole (313) to pivot the free end of the hook (32) upward so as to open the opening of the cutout (311) of the securing body (31), as shown in FIGS. 6A to 6C. Further, because of the provision of the resilient member (38) which is mounted around the securing bolt (34), after the pressing bolt (36) is pressed, the resilient force stored in the resilient member (38) pushes the pressing bolt (36) back to its original position, as shown in FIGS. 5A and 5B.

At the conclusion of the movement of the hook (32) from the lower large hole (313) to the upper large hole (313), the hook (32) opens the opening of the cutout (311) of the securing body (31). Thus after the rod (11) is received in the cutout (311) and the hook (32) is moved from a first position to a second position, the rod (11) is secured to the securing body (31). On the contrary, when the hook (32) is moved from the lower large hole (313) to the upper large hole (313), the fire end of the hook (32) opens the opening of the cutout (311) to release the confinement of the rod (11).

Figure 7:
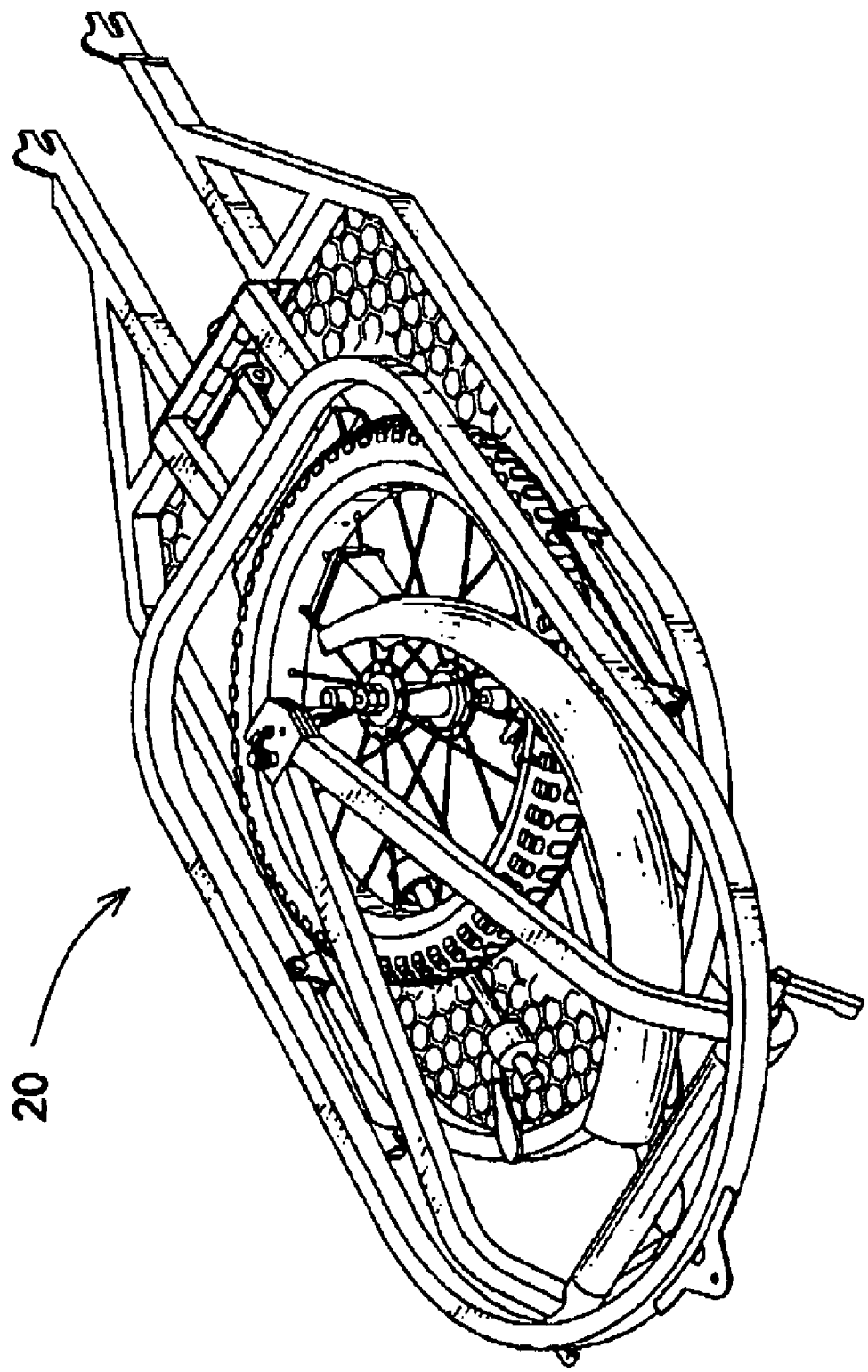
FIG. 7 is a perspective view of the bike trailer in FIG. 1 in a folded state.

With reference to FIG. 7, it is noted that the bike trailer can folded to be compact, which is conventional in the art and the details of how the bike trailer is folded will not be described in any detail.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A securing assembly for use between a bike having a rear wheel provided with a rod extending transversely through and out of two opposite sides of a hub and a bike trailer having a bracket with two arms extending out of the bracket, the securing assembly comprising:
    a securing body adapted to be integrally formed with each of the two arms of the bracket, provided with a gap defined in the securing body and composed of two plates each provided with an elongated hole and a cutout to respectively correspond to and align with the elongated hole and cutout of the other plate of the securing body, and the elongated hole being composed of two large holes and a small hole being defined between and communicating with the two large holes;
    a hook pivotally and movably received in the gap such that when the hook is at a first position, the hook is able to align with an opening of the cutout so as to confine a free end of the rod after the free end of the rod is received in the cutout and when the hook is at a second position, the hook is able to open the cutout to release a confinement to the free end of the rod to allow the free end of the rod to escape from the securing body to allow disengagement between the bike trail and the bike;
    a pressing bolt extending through the elongated hole and a central hole defined in a central portion of the hook, being movable relative to the securing body and having a first head formed on one end of the pressing bolt and a channel defined in the other end of the pressing bolt; and
    a moving bolt being screwed into the channel to securely engage the pressing bolt and having a second head formed on one end of the moving bolt and the second head being provided with a diameter smaller than a diameter of either one of the two large holes and larger than a diameter of the small holes of the plates so that when the second head is received in either one of the two large holes, the second head is securely received in one of the large holes and the hook is thus fixed.

2. The securing assembly as claimed in claim 1 further comprising a securing bolt extending through the securing body and a hole defined in a top portion of the hook to engage a nut to pivotally receive the hook in the gap in the securing body.

3. The securing assembly as claimed in claim 2 further comprising a resilient member mounted around the pressing bolt to push the pressing bolt back to its original position after the pressing bolt is moved toward the securing body.

4. The securing assembly as claimed in claim 3, wherein the resilient member is composed of two washers and a spring sandwiched between the two washers to provide recovery force to the pressing bolt.

* * * * *